(12) United States Patent
Beckey et al.

(10) Patent No.: US 8,602,373 B2
(45) Date of Patent: Dec. 10, 2013

(54) HANGABLE CUP HOLDERS

(76) Inventors: Mark Beckey, San Antonio, TX (US);
Garen Garanidian, San Dimas, CA (US)

( * ) Notice: Subject to any disclaimer, the term of this patent is extended or adjusted under 35 U.S.C. 154(b) by 0 days.

(21) Appl. No.: 13/189,880

(22) Filed: Jul. 25, 2011

(65) Prior Publication Data
US 2013/0026336 A1 Jan. 31, 2013

(51) Int. Cl.
*A47K 1/08* (2006.01)

(52) U.S. Cl.
USPC ............... 248/311.2; 248/312.1; 248/309.1; 248/315

(58) Field of Classification Search
USPC ........... 248/312.1, 312, 309.1, 314, 315, 146, 248/301, 303, 305, 307
See application file for complete search history.

(56) References Cited

U.S. PATENT DOCUMENTS

| | | | |
|---|---|---|---|
| 1,530,256 A * | 3/1925 | Garland | 220/743 |
| D162,959 S | 4/1951 | Janes et al. | |
| D164,692 S | 5/1951 | Kelley | |
| 2,707,141 A * | 4/1955 | Witter | 108/26 |
| 2,763,413 A | 9/1956 | Felton | |
| 2,831,647 A | 4/1958 | MacKay | |
| 2,911,016 A * | 11/1959 | Kenney | 141/328 |
| 2,967,691 A * | 1/1961 | Lehnbeuter et al. | 248/312.1 |
| 3,653,624 A * | 4/1972 | Abel | 248/312 |
| D226,623 S | 4/1973 | Shuford | |
| 4,245,807 A * | 1/1981 | York | 248/310 |
| 4,557,452 A | 12/1985 | Khuong | |
| 4,634,089 A | 1/1987 | Wright et al. | |
| 4,715,633 A * | 12/1987 | Brink et al. | 294/31.2 |
| 4,826,058 A | 5/1989 | Nakayama | |
| 4,867,332 A * | 9/1989 | Mains | 220/735 |
| 4,943,025 A | 7/1990 | Warner | |
| 4,951,910 A * | 8/1990 | March | 248/311.2 |
| 4,998,277 A * | 3/1991 | Rioux, Jr. | 379/454 |
| 5,143,335 A * | 9/1992 | Frankel | 248/215 |
| 5,320,319 A * | 6/1994 | Winger et al. | 248/312.1 |
| 5,325,991 A * | 7/1994 | Williams | 220/739 |
| 5,362,077 A | 11/1994 | Adamson | |
| 5,425,497 A | 6/1995 | Sorensen | |
| 5,494,306 A | 2/1996 | Adamson et al. | |
| 5,505,330 A * | 4/1996 | Nunes | 220/742 |
| 5,584,520 A * | 12/1996 | Niemeier | 294/34 |
| 5,697,587 A * | 12/1997 | Israel | 248/214 |
| D400,678 S | 11/1998 | Clark et al. | |
| 5,857,601 A * | 1/1999 | Greenwood | 224/409 |
| 5,913,463 A | 6/1999 | Carr | |
| 5,938,091 A | 8/1999 | Bergin et al. | |
| 6,119,996 A * | 9/2000 | Connery | 248/311.2 |
| 6,484,989 B1 * | 11/2002 | Connery | 248/311.2 |
| 6,550,737 B1 * | 4/2003 | Sai et al. | 248/311.2 |

(Continued)

FOREIGN PATENT DOCUMENTS

GB 2 407 252 A 4/2005

*Primary Examiner* — Nkeisha Smith
(74) *Attorney, Agent, or Firm* — Haynes and Boone, LLP

(57) ABSTRACT

In one example, a holder for a frusto-conical beverage cup useable in conjunction with a frusto-conical sleeve, such as a corrugated paper heat sleeve, to hold the cup and enable it to be hung from a suitable hanging feature, such as a car door handle, includes an elongated vertical shank portion having front and rear surfaces and a pair of recurvate hooks respectively disposed at upper and lower ends thereof, an upper one of the hooks defining a downwardly opening channel, and a lower one of the hooks defining an upwardly opening channel.

14 Claims, 7 Drawing Sheets

(56) References Cited

U.S. PATENT DOCUMENTS

| | | |
|---|---|---|
| 6,616,109 B1 * | 9/2003 | Jarrett et al. .................. 248/201 |
| D480,555 S * | 10/2003 | Bledsoe .......................... D3/215 |
| 6,641,100 B2 * | 11/2003 | Furukawa .................. 248/309.1 |
| 6,644,524 B1 | 11/2003 | Garvin |
| 6,749,204 B2 * | 6/2004 | Werner .................... 280/33.992 |
| 6,752,279 B1 * | 6/2004 | Dwyer .......................... 211/107 |
| 7,044,424 B2 * | 5/2006 | Robertson et al. ......... 248/311.2 |
| 7,344,116 B2 * | 3/2008 | Ficarra et al. .............. 248/311.2 |
| 7,404,534 B1 * | 7/2008 | Hajianpour ................ 248/230.1 |
| 7,475,884 B2 | 1/2009 | Ryan |
| D632,930 S | 2/2011 | Cheretien |
| 8,006,862 B2 * | 8/2011 | Leslie ........................... 220/739 |
| 8,061,551 B2 * | 11/2011 | Matlovich ..................... 220/739 |
| 2001/0032915 A1 | 10/2001 | Clifford |
| 2003/0132590 A1 * | 7/2003 | Werner .................... 280/33.992 |
| 2004/0129852 A1 | 7/2004 | Giampavolo |
| 2005/0199667 A1 | 9/2005 | Cappellino et al. |
| 2007/0007416 A1 | 1/2007 | Vogel |
| 2007/0085281 A1 | 4/2007 | Ryan |
| 2008/0035819 A1 | 2/2008 | Garfin et al. |
| 2008/0237284 A1 | 10/2008 | Peota et al. |
| 2009/0236381 A1 | 9/2009 | Buehler |
| 2009/0242717 A1 | 10/2009 | Stonehouse |

* cited by examiner

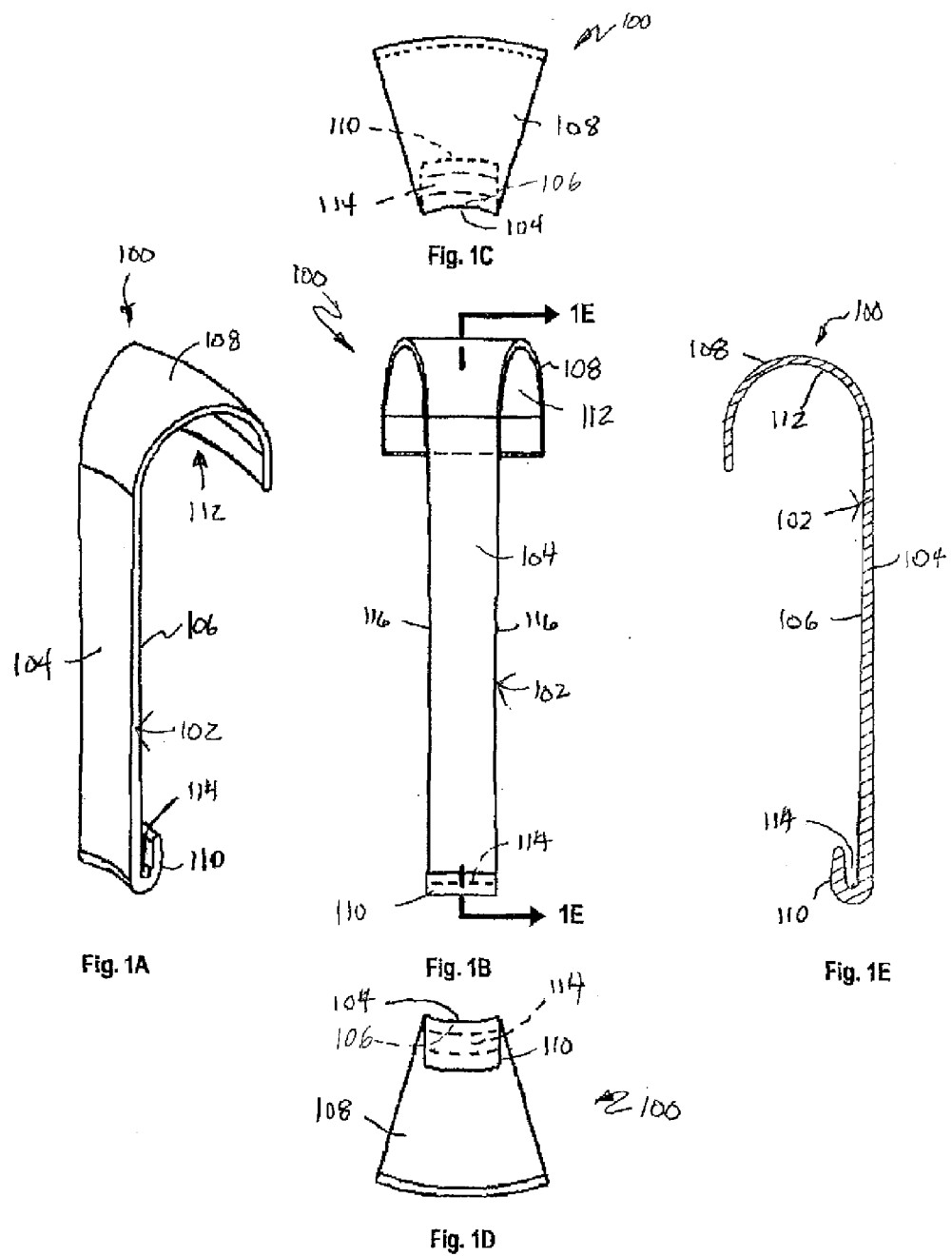

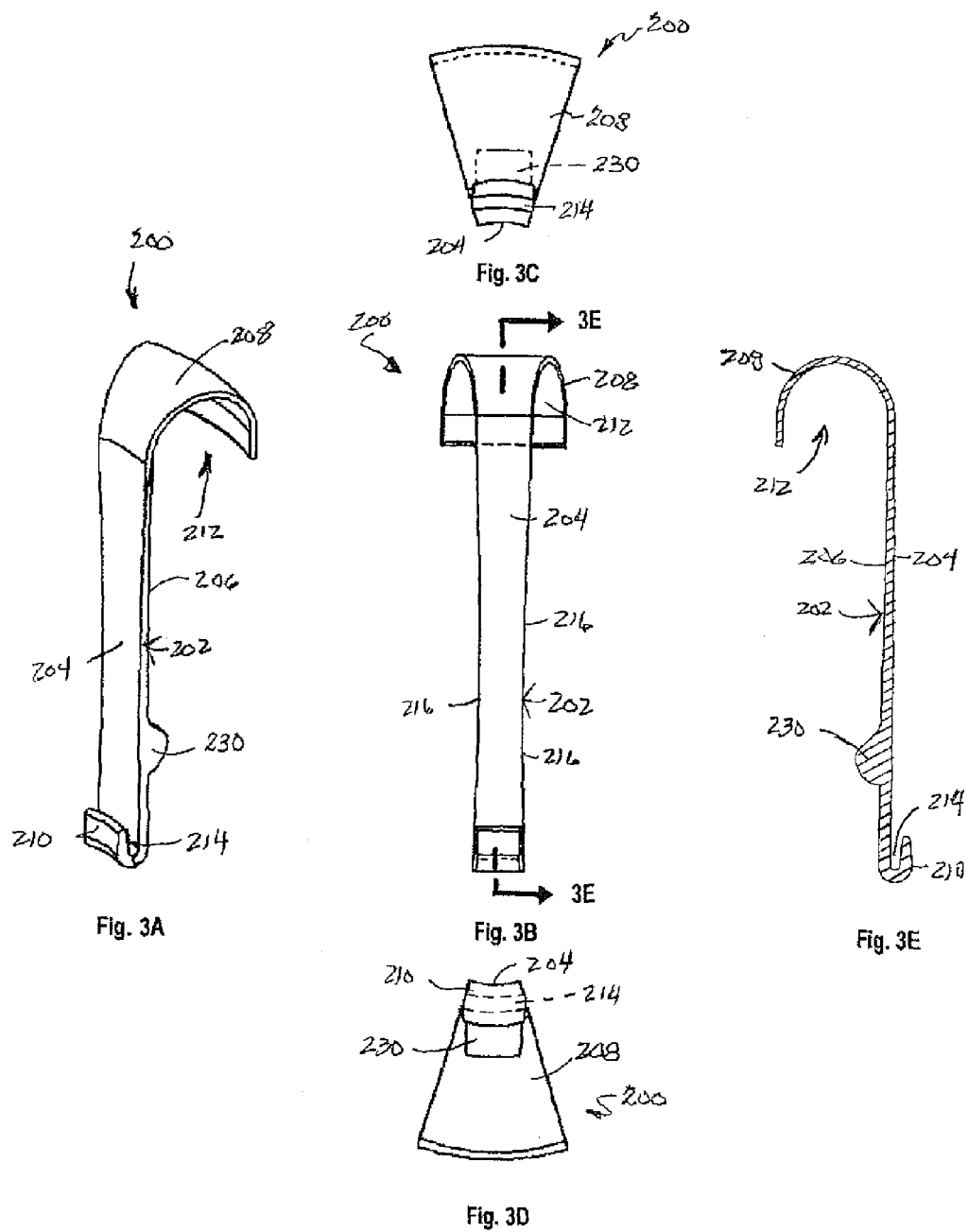

HANGABLE CUP HOLDERS

BACKGROUND

1. Technical Field

This disclosure relates to cup holders in general, and in particular, to a holder for a frusto-conical beverage cup useful in conjunction with a frusto-conical sleeve, such as a heat-insulating paper sleeve, to hold the cup and its contents and enable them to be hung from a suitable hanging feature, such as the side of a shopping cart.

2. Related Art

The peripatetic lifestyles of many today often involve several "mobile" activities, including mobile computing, mobile communications, and in some cases, even mobile dining, i.e., eating and drinking "on the run." Indeed, in many areas, specialty vendors are prevalent, such as Starbucks, Peet's Coffee and the Coffee Bean & Tea Leaf Co., who specialize in the preparation of popular beverages, such as coffee, espresso, tea and other hot and cold "takeout" beverages for customers who are in a hurry. In such instances, the beverages are typically served up in frusto-conical paper or plastic cups, and in the case of hot beverages, in cups surrounded by an insulating, frusto-conical "heat sleeve," typically made of cloth or corrugated and/or recycled paper.

Where the customer has the time to linger at the shop at which the beverage is procured while it is consumed, it is a small matter to rest the flat bottom of the cup on a corresponding surface of a table or counter provided by the shop for that purpose. However, if the customer leaves the shop with the beverage to pursue another activity, e.g., shopping, he or she could encounter a problem if it becomes necessary to use both hands, e.g., to effect a debit or credit card transaction, open a locked car door, or lift a heavy carton onto a shopping cart, when there is no nearby flat surface upon which to set the beverage cup.

Accordingly, what are needed are light weight, inexpensive, easy to use, yet reliable holders for frusto-conical beverage cups that are useable in conjunction with frusto-conical sleeves, such as giveaway heat insulating sleeves, to hold the cup and enable it to be hung from a nearby hanging feature, such as a shopping cart or a car door handle.

SUMMARY

In accordance with the present disclosure, holders for frusto-conical beverage cups are described that are useful in conjunction with a frusto-conical sleeve, such as a paper heat sleeve provided with the cup, to hold the cup and its contents and enable them to be hung from a suitable, nearby hanging feature, such as a car door handle, the side of a shopping cart, an airline seat-back tray, or many other like features.

In one example embodiment, a cup holder comprises an elongated vertical shank portion having front and rear surfaces and a pair of recurvate hooks respectively disposed at upper and lower ends thereof, an upper one of the hooks defining a downwardly opening channel and a lower one of the hooks defining an upwardly opening channel.

Both the upper and lower hooks can be disposed behind the rear surface of the shank portion. In this embodiment, a method for using the cup holder can comprise inserting the lower hook of the holder into a frusto-conical sleeve and below a lower end thereof, sliding a portion of the lower end of the sleeve downwardly and into the channel of the lower hook, and sliding a lower end of a frusto-conical cup downwardly, into the sleeve and against the front surface of the shank portion of the holder, until the weight of the cup and any contents therein are borne by the sleeve and the lower hook of the holder.

In another example embodiment, the upper hook can be disposed behind the rear surface of the shank portion, the lower hook can be disposed in front of the front surface of the shank portion, and a protrusion can be provided on the rear surface of the shank portion and above the lower hook. In this embodiment, a method for using the cup holder can comprise inserting the lower hook of the holder into a frusto-conical sleeve such that a lower end of the sleeve is disposed above the protrusion, and sliding a lower end of a frusto-conical cup downwardly into the sleeve and against a front surface of the shank portion of the holder until a lip portion of the lower end of the cup is engaged in the channel of the lower hook, the lower end of the sleeve is disposed above the protrusion and the weight of the cup and any contents therein are borne by the sleeve and the holder.

The cup holders for one or more embodiments described herein enable an assembly formed by the holder, the sleeve and the cup to be held in the hand of a user, e.g., for consumption of a beverage from the cup while walking, to be set generally upright on a flat surface, such as a table top, in the conventional manner, or advantageously, to be hung from an adjacent hanging feature, such as an airline seat-back tray disposed in the upright and locked position, thereby freeing both the user's hands for other tasks.

A better understanding of the above and many other features and advantages of the novel cup holders of the present disclosure and the several methods of their use can be obtained from a consideration of the detailed description of some example embodiments thereof below, particularly if such consideration is made in conjunction with the appended drawings, wherein like reference numerals are used to identify like elements illustrated in one or more of the figures thereof.

BRIEF DESCRIPTION OF THE FIGURES OF THE DRAWINGS

FIG. 1A is a front and left side perspective view of a first example embodiment of a cup holder in accordance with the present disclosure;

FIG. 1B is a front elevation view thereof;

FIG. 1C is a top plan view thereof;

FIG. 1D is a bottom plan view thereof;

FIG. 1E is a cross-sectional view of the cup holder, as seen along the lines of the section 1E-1E taken in FIG. 1B;

FIG. 3A is a front and left side perspective view of a second example embodiment of a cup holder in accordance with the present disclosure;

FIG. 3B is a front elevation view thereof;

FIG. 3C is a top plan view thereof;

FIG. 3D is a bottom plan view thereof;

FIG. 3E is a cross-sectional view of the cup holder, as seen along the lines of the section 3E-3E taken in FIG. 3B;

DETAILED DESCRIPTION

In accordance with the present disclosure, holders for frusto-conical beverage cups are described that are useable in conjunction with a frusto-conical sleeve, such as a paper heat sleeve, to hold the cup and enable it to be hung from a suitable, nearby hanging feature, such as a car door handle or a side of a shopping cart.

Figure 2A:
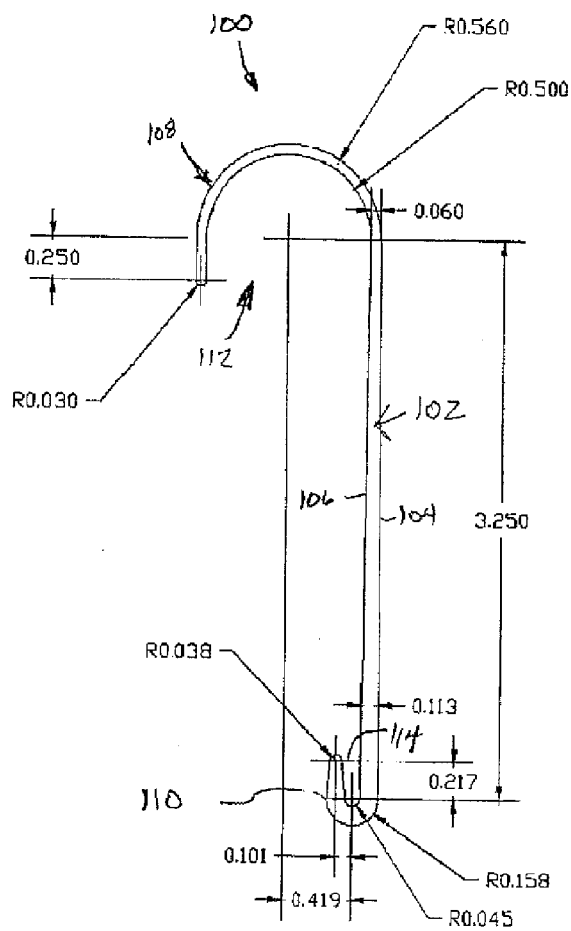
FIGS. 2A-2C are cross-sectional, bottom plan and rear end elevation views, respectively, of the first example embodiment, showing some possible dimensions thereof.
Figure 2B:
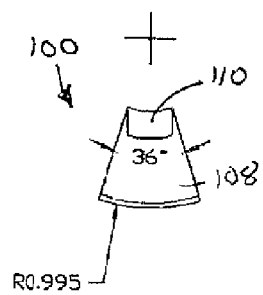
Figure 2C:
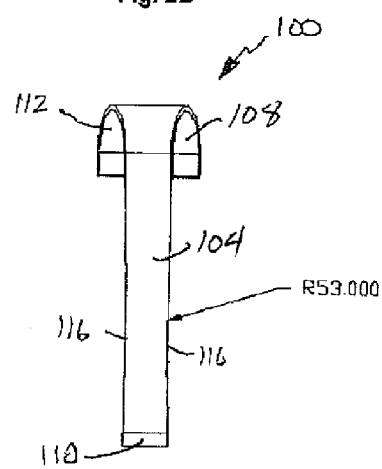

FIGS. 1A-1E illustrate various features of a first example embodiment of a cup holder 100 in accordance herewith. FIGS. 2A-2C are cross-sectional, bottom plan and rear side elevation views, respectively, of the first example cup holder 100, showing possible example dimensions thereof. However, it should be understood that these dimensions and configurations are presented merely by way of one example, and other embodiments of the cup holder 100 can incorporate other dimensions and shapes.

With reference to these figures, the first example cup holder 100 comprises an elongated vertical shank portion 102 having front and rear surfaces 104, 106, and a pair of recurvate hooks 108, 110 respectively disposed at upper and lower ends thereof. As can be seen in, e.g., FIG. 1A, the upper hook 108 defines a downwardly opening 112, and the lower hook 110 defines an upwardly opening channel 114.

As can be seen in, e.g., FIGS. 1C and 1D, in some embodiments, each of the front and rear surfaces 104 and 106 of the shank portion 102 can define a segment of a circle in a transverse plane cross-section, i.e., a cross-section taken in a transverse plane through the shank portion 102. As can also be seen in these figures, each of the downwardly and upwardly opening hook channels 112 and 114 includes opposing inner surfaces, each of which, in some embodiments, can also define a segment of a circle in a transverse plane cross-section through the upper or lower hooks 108 and 110. The result, as discussed in more detail below in connection with FIG. 5 (and similarly for another embodiment shown in FIG. 6), is that the front surface 104 of the shank portion 102 can incorporate a curvature corresponding to a segment of an outside surface of a frusto-conical cup placed against it, and similarly, the upward opening channel 114 in the lower hook 110 can incorporate a curvature that is configured to receive a portion of a lower end of a frusto-conical insulating sleeve in a slide-in engagement, or alternatively, in another embodiment described below, a lip portion of the lower end of a frusto-conical beverage cup.

In some embodiments of the cup holder 100, each of the upper and the lower hooks 108 and 110 can include inner and outer surfaces that are arcuate, as seen in a sagittal plane cross-section, e.g., FIGS. 1E and 2A, and in some embodiments, such as that illustrated in these figures, a portion of each of the inner and outer surfaces of each of the upper and lower hooks 108 and 110 can define a semicircle in the sagittal plane cross-section, such that the upper and lower channels 112 and 114 respectively defined thereby are generally U-shaped in cross-section.

Figure 11:
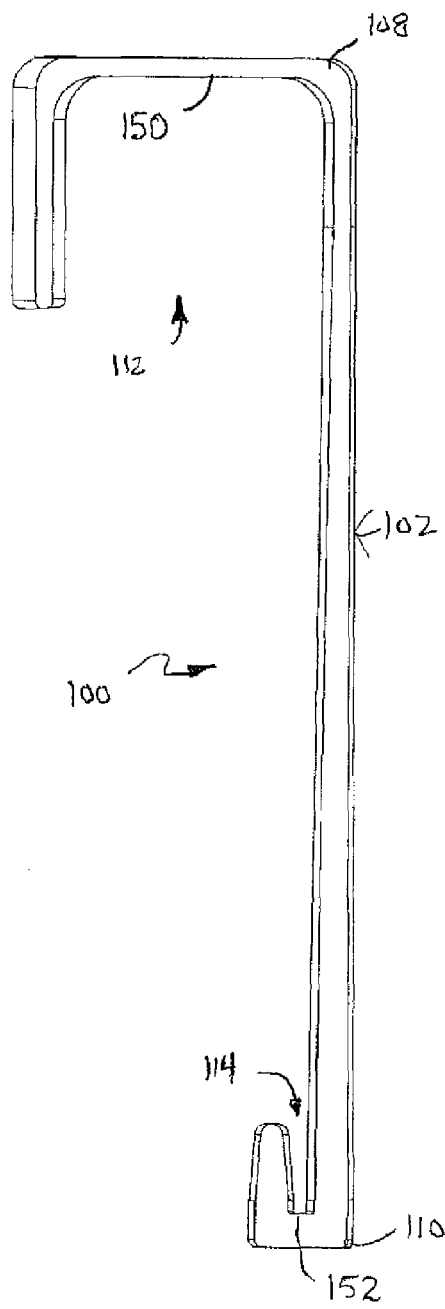
FIG. 11 is an enlarged left side elevation view of another example cup holder; and, FIG. 12 is an enlarged left side elevation view of another example cup holder.
Figure 12:
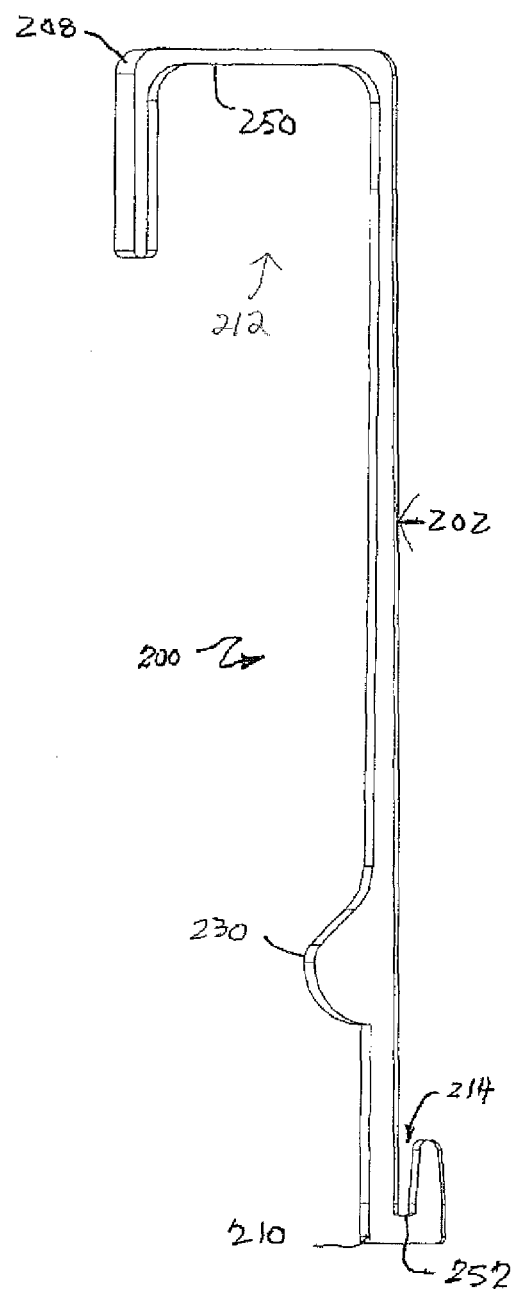

Alternatively, as illustrated in FIGS. 11 and 12, one or both of the upper hooks 108/208 and lower hooks 110/210 can incorporate a more squared-off shape in a sagittal plane cross-section, such that one or both of the upper channels 112/212 and lower channels 114/214 are generally U-shaped in cross-section, with respective channel surfaces 150/250 and 152/252 that are generally flat. In yet other possible embodiments, the upper channels 112/212 and lower channels 114/214 can exhibit other cross-sectional shapes.

As seen in, e.g., FIGS. 1B and 2C, the shank portion 102 can include opposite side surfaces 116 that taper toward each other from the upper end of the shank portion 102 to the lower end thereof, such that the upper hook 108 is relatively larger than the lower hook 110, and in the particular example cup holder 100 illustrated in FIGS. 1B and 2C, each of the side surfaces 116 of the shank portion 102 defines a segment of a circle in a coronal plane cross-section through the shank portion 102. However, as those of skill in the art will appreciate, the shank portion 102 need not be tapered at all, or alternatively, can incorporate, for example, tapered straight sides 116. Additionally, it should be understood that, although the particular example cup holder 100 illustrated in the figures is generally bilaterally symmetrical about a sagittal plane, it need not necessarily be so, and in some embodiments, the cup holder 100 can be asymmetrical with respect to a sagittal plane.

As can be seen in, e.g., FIGS. 1E and 2A, in the example cup holder 100 illustrated, both the upper and the lower hooks 108 and 110 are disposed behind the rear surface 106 of the shank portion 102, and as discussed above, the upward opening channel 114 in the lower hook 110 can incorporate a curvature that is configured to receive a portion of a lower end of a frusto-conical insulating sleeve in a slide-in engagement. With the foregoing as prologue, FIG. 5 illustrates a method for using the first example cup holder 100 in conjunction with a frusto-conical sleeve 120, to hold a frusto-conical cup 122 and enable it and its contents to be hung from a suitable, nearby hanging feature 124.

Figure 5:
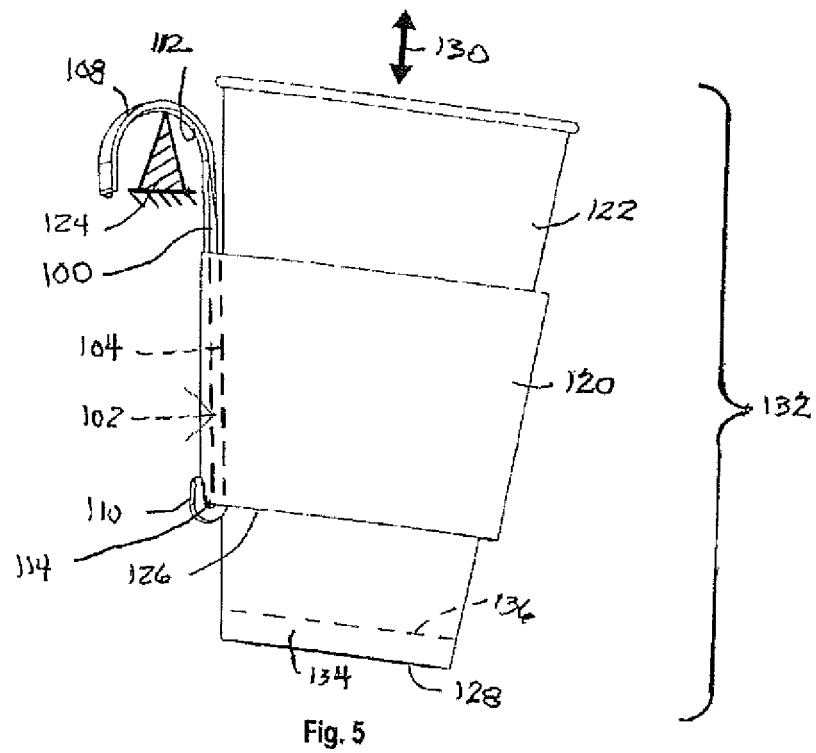
FIG. 5 is a right side elevation view of the first example cup holder of FIGS. 1A-1E, showing an assembly of the holder, an associated frusto-conical sleeve and a frusto-conical cup hanging from a hanging feature.

With reference to FIG. 5, the method comprises inserting the lower hook 110 of the holder 100 into the frusto-conical sleeve 120 and below the lower end 126 thereof. A portion of the lower end 126 of the sleeve 120 is then slid downwardly and into engagement in the upwardly opening channel 114 of the lower hook 110. The lower end 128 of the cup 122 is then slid downwardly, in the direction of the arrow 130 in FIG. 5, into the sleeve 120 and against the conforming front surface 104 of the shank portion 102 of the holder 100, until the weight of the cup 122 and any contents therein, such as coffee, are borne by the sleeve 120 and the lower hook 110 of the holder 100.

As illustrated in FIG. 5, the holder 100, sleeve 120 and cup 122 form a tight, unitary assembly 132 that can be supported from a hanging feature 124 by hanging the upper hook 108 of the holder 100 over the hanging feature 124. In this regard, it is desirable that the hanging feature 124 have a width, i.e., a dimension extending into the page of the figure, that is about equal to or greater than the length of the downwardly opening channel 112 of the upper hook 108, an upper surface having at least a portion that is generally horizontal, and a depth, i.e., a dimension transverse to its length, that is sized to fit at least partially within the downwardly opening channel 112 of the upper hook 108. As illustrated and described below, suitable hanging features 124 can comprise a wide variety of features, for example, horizontally disposed features on a shopping cart, a car door handle, a handle of a stove door, a front panel of a drawer, an airline seat-back tray when disposed in an upright and locked position, the hand of a user of the cup holder 100, and many other such features present in the local environment.

As those of some skill will appreciate, when the assembly 132 of the holder 100, sleeve 120 and cup 122 is suspended from a relatively narrow feature, such as a small horizontal pipe, a thin wire, or the fulcrum 124 illustrated in FIG. 5, the center of mass of the assembly 132 and the contents of the cup 122 will form a moment relative to the hanging feature 124 that would tend to rotate the assembly downward and to the left relative to the feature 124, which could result in some spillage of the contents from the cup 122 if it is relatively full. However, if a hanging feature 124 is selected that includes a generally vertical feature or surface disposed below the generally horizontal upper surface of the feature 124, such as any one of the example hanging features 124 described above, then a rear surface of at least one of the holder 100, the sleeve 120 and/or the lower hook located below the upper hook 108 of the holder 100 will be disposed in abutment with the generally vertical surface of the hanging feature 124, and the cup 122 will be held in a generally upright, no-spill orientation.

Figure 4A:
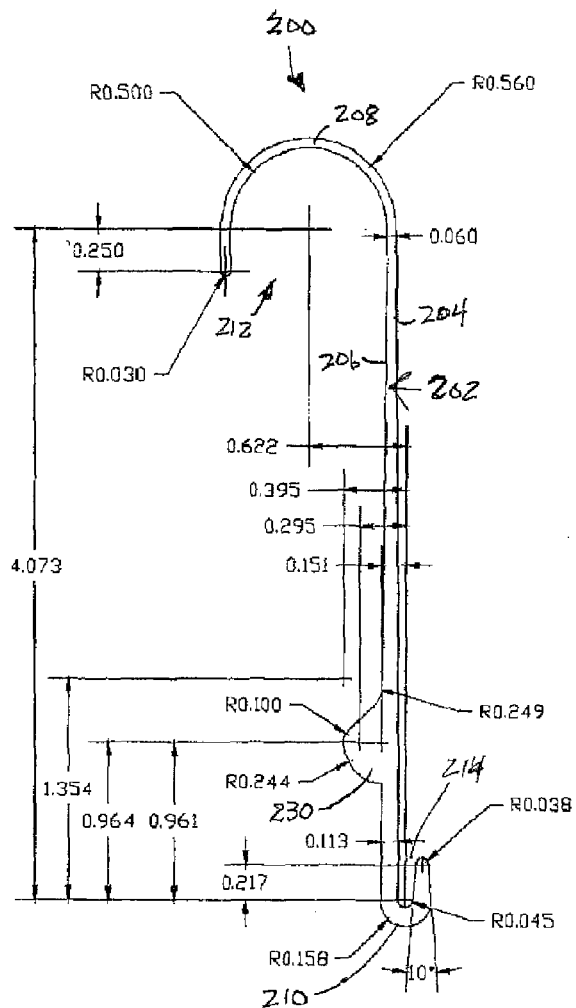
FIGS. 4A-4C are cross-sectional, bottom plan and rear end elevation views, respectively, of the first example embodiment, showing dimensions of one possible example embodiment thereof.
Figure 4B:
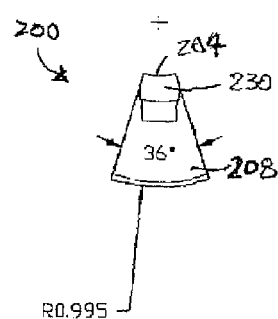
Figure 4C:
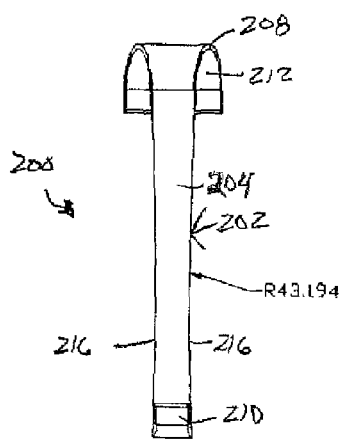

FIGS. 3A-3E illustrate various features of a second example embodiment of a cup holder 200 in accordance herewith. FIGS. 4A-4C are cross-sectional, bottom plan and rear end elevation views, respectively, of the second example cup holder 200, showing possible example dimensions thereof. However, as with the first embodiment above, these dimensions and configurations are presented as merely one possible example thereof, and other embodiments of the cup holder 200 can incorporate other dimensions and configurations. FIG. 12 is a left side elevation view of an alternative embodiment of the second example cup holder 200, incorporating upper and/or lower hooks 208, 210 that are more squared in cross-section.

As can be seen from a comparison of the two groups of figures, the second example cup holder 200 is similar in many respects to the first example cup holder 100, and accordingly, a description of these similarities is omitted for brevity and in favor of a discussion of the dissimilarities between them. For example, as can be seen in a comparison of FIGS. 2A and 4A, the lower hook 210 of the second example cup holder 200 is located a greater distance below the upper hook 208 of the second holder 200 than is the case in the first example cup holder 100. Additionally, in the cup holder 200, the upper hook 208 is disposed behind the rear surface 206 of the shank portion 202, as in the first embodiment 100 above, whereas, unlike in the first embodiment 100, the lower hook 210 is disposed in front of the front surface 204 of the shank portion 202. Additionally, in the second example cup holder 200, a rearwardly projecting protrusion 230 is provided on the rear surface 206 of the shank portion 202 and above the lower hook 210 thereof, the function of which is discussed below.

Figure 6:
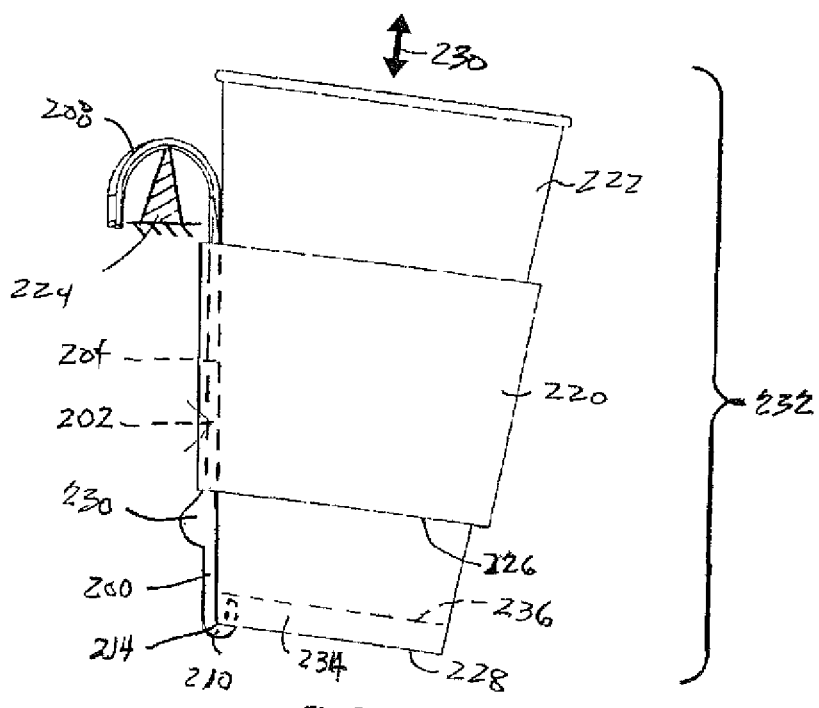
FIG. 6 is a right side elevation view of the second example cup holder of FIGS. 3A-3E, showing an assembly of the holder, an associated frusto-conical sleeve and a frusto-conical cup hanging from a hanging feature.

As illustrated in FIG. 6, these differences give rise to a somewhat different method of using the second example cup holder 200. With reference to FIG. 6, an example method for using the cup holder 200 comprises inserting the lower hook 210 of the holder 200 into a frusto-conical sleeve 220 such that a lower end 226 of the sleeve 220 is disposed above the rearwardly extending protrusion 230. A lower end 228 of a frusta-conical cup 222 is then slid downwardly, in the direction of the arrow 230 in FIG. 6, into the sleeve 220 and against the front surface 204 of the shank portion 202 of the holder 200, until a lip portion 234 of the lower end 228 of the cup 222 is engaged in the upwardly opening channel 214 of the lower hook 210, the lower end 226 of the sleeve 220 is disposed above the protrusion 230, and the weight of the cup 222 and any contents therein are borne by the sleeve 220 and the holder 200. As in the first embodiment above, the holder 200, sleeve 220 and cup 222 then form a tight, unitary assemblage 232 that can be hung from a suitable hanging feature 224 in a manner similar to that discussed above in connection with the first example cup holder 100.

With reference to FIGS. 5 and 6, it will be seen that the cup 122/222 illustrated is of a type that includes a bottom 136/236 that is recessed above the lower end 128/228 of the cup. As those of skill in the art will appreciate, in some types of cups (not illustrated), the cup bottom 136/236 can be located generally co-planar with the lower end 128/228 of the cup. It should be understood that both of the example cup holders 100 and 200 described above can easily accommodate this type of cup 122/222, the only difference being that, in the use of the second example cup holder 200, both the bottom 236 and the generally co-planar bottom end 228 of the cup 222 will be disposed atop the upper end of the bottom hook 210.

Figure 7:
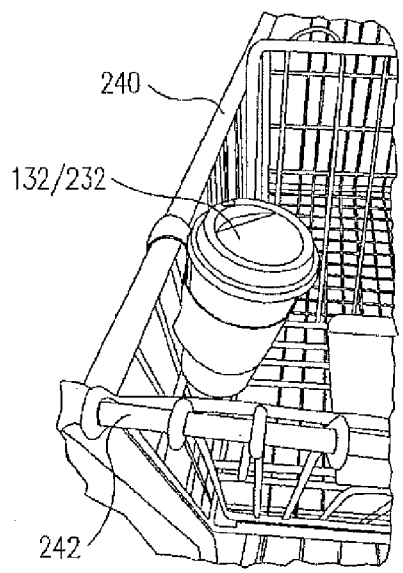
FIG. 7 is a perspective view of the holder, sleeve, and cup assembly, shown hanging from a side wall of a shopping cart.
Figure 8:
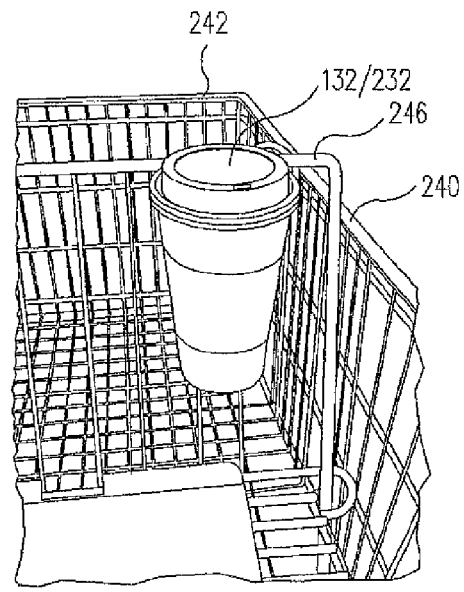
FIG. 8 is a perspective view of the assembly, shown hanging from a back of child's seat in a shopping cart.
Figure 9:
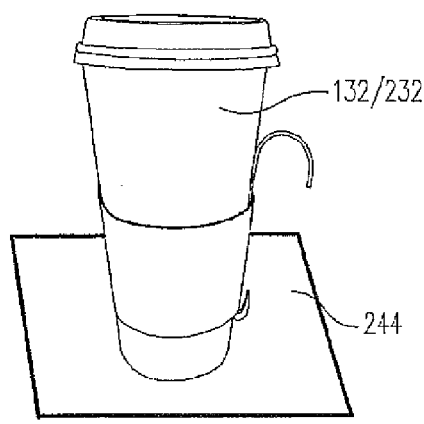
FIG. 9 is a perspective view of the assembly, shown resting of a flat table top.
Figure 10:
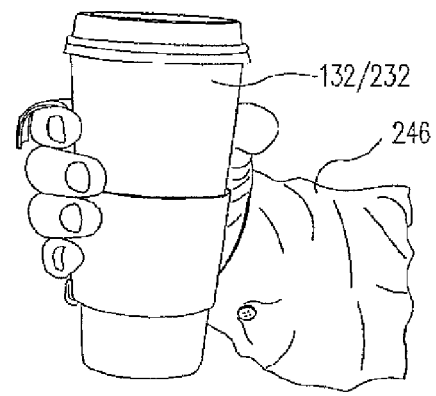
FIG. 10 is a perspective view of the assembly being held in the hand of a user.

FIGS. 7-10 illustrate some example uses to which the cup holders 100 and 200 can be advantageously applied. In FIG. 7, the unitary cup-sleeve-holder assembly 132/232 is shown hanging from a side wall 240 of a shopping cart 242, while in FIG. 8, the assembly 132/232 is shown hanging from the back of a child's folding seat 246 in the shopping cart 242. In FIG. 9, a cup-sleeve-holder assembly 132/232 is shown with its bottom surface sitting on the top of a flat table or counter 244 in the conventional manner, and in FIG. 10, being held in the hand of a user 246. However, it should be understood that the example uses illustrated are by way of example only, and that the cup holders described and illustrated herein are capable of many other convenient uses.

As those of some skill in the art will appreciate, either of the example cup holders 100 and 200 can be inexpensively manufactured by a number of widely known methods and in a variety of materials. For example, the cup holders 100 and 200 can be manufactured by stamping and forming a resilient metal, such as a mild steel, or a thermoforming plastic material. Alternatively, they can be manufactured inexpensively of, e.g., plastic, in a molding process, e.g., an injection molding process.

In light of the foregoing use and manufacturing examples, it should be clear that many modifications, substitutions and variations can be made in and to the materials, apparatus, configurations and methods of use the cup holders of the present disclosure, and in light thereof, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:
1. A holder for a frusto-conical cup, the holder comprising:
an elongated vertical shank portion having front and rear surfaces and a pair of recurvate hooks respectively disposed at upper and lower ends thereof;
an upper one of the hooks defining a downwardly opening channel;
a lower one of the hooks defining an upwardly opening channel; and
a frusto-conical sleeve configured to receive a lower end portion of the cup in a complementary slide-in engagement, wherein the sleeve is disposed over a lower end portion of the shank portion such that the shank portion is disposed between the cup and the sleeve, a lower end of the sleeve is disposed in the upwardly opening channel of the lower hook and the weight of the cup and any contents therein are borne by the sleeve and the lower hook.

2. The cup holder of claim 1, wherein at least one of the front and rear surfaces of the shank portion defines a segment of a circle in a transverse plane cross-section.

3. The cup holder of claim 1, wherein at least one of the downwardly and upwardly opening channels includes opposing inner surfaces, at least one of which defines a segment of a circle in a transverse plane cross-section.

4. The cup holder of claim 1, wherein at least one of the upper and the lower hooks includes an inner surface and an outer surface, and wherein at least one of the surfaces is arcuate in a sagittal plane cross-section.

5. The cup holder of claim 4, wherein a portion of the at least one surface defines a semicircle in the sagittal plane cross-section.

6. The cup holder of claim 1, wherein the shank portion includes opposite side surfaces that taper toward each other from the upper end of the shank portion to the lower end thereof.

7. The cup holder of claim 6, wherein at least one of the side surfaces of the shank portion defines a segment of a circle in a coronal plane cross-section.

8. The cup holder of claim 1, wherein both the upper and lower hooks are disposed behind the rear surface of the shank portion.

9. The cup holder of claim 8, wherein the upwardly opening channel is configured to receive a portion of the lower end of the frusto-conical sleeve in a slide-in engagement.

10. The cup holder of claim 1, wherein at least the shank portion of the holder comprises a molded plastic.

11. A method comprising:

providing a holder for a frusto-conical cup, the holder comprising: an elongated vertical shank portion having front and rear surfaces and a pair of recurvate hooks respectively disposed at upper and lower ends thereof, an upper one of the hooks defining a downwardly opening channel, a lower one of the hooks defining an upwardly opening channel, and a frusto-conical sleeve configured to receive a lower end portion of the cup in a complementary slide-in engagement;

inserting the lower hook into and below a lower end of the sleeve, sliding a portion of the lower end of the sleeve downwardly and into the upwardly opening channel of the lower hook; and sliding a lower end portion of the frusto-conical cup downwardly, into the sleeve and against the front surface of the shank portion of the holder such that the shank portion is disposed between the cup and the sleeve and the weight of the cup and any contents therein are borne by the sleeve and the lower hook.

12. The method of claim 11, further comprising hanging the upper hook of the holder over a hanging feature having a width about equal to or greater than the length of the downwardly opening channel of the upper hook, an upper surface having at least a portion that is generally horizontal, and a depth configured to fit at least partially within the downwardly opening channel of the upper hook.

13. The method of claim 12, wherein:

the hanging feature includes a generally vertical surface disposed below the generally horizontal surface, and a rear surface of at least one of the holder, the sleeve, and/or the lower hook located below the upper hook of the holder is disposed in abutment with the generally vertical surface of the hanging feature.

14. The method of claim 13, wherein the hanging feature comprises a shopping cart, a car door handle, a handle of a stove door, a front panel of a drawer, an airline seat tray disposed in an upright and locked position, or a hand of a user.

* * * * *